UNITED STATES PATENT OFFICE 2,390,082

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application June 26, 1944, Serial No. 542,237

6 Claims. (Cl. 252—341)

This invention relates to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude oil and relatively soft waters or brines. Controlled emulsion and subsequent demulsification, under the conditions just mentioned, is of significant value in removing impurities, particularly inorganic salts from pipeline oil.

Demulsification, as contemplated in the present application, includes the preventive step of commingling the demulsifier with the aqueous component which would or might subsequently become either phase of the emulsion in absence of such precautionary measure.

The new material herein described, that is used as the demulsifier of my process, consists of sub-resinous reaction products derived by reaction between:

(A) A polybasic carboxy acid compound characterized by (a) the presence of at least one free carboxyl radical or its obvious equivalent; (b) the absence of any hydroxy fatty acid radical as a substituent for an acidic hydrogen atom of any carboxyl radical; and (c) the absence of any polyhydric alcohol radical as a substituent for an acidic hydrogen atom of any carboxyl radical, if said polyhydric alcohol radical is also united with one or more monobasic carboxy detergent-forming acid radicals; and (B) A basic esterified etheraminoalcohol of the formula:

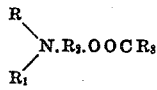

in which R is an ether radical having as an integral part thereof a hydrocarbon radical containing 8 carbon atoms and not more than 32 carbon atoms, and selected from the class consisting of alkyl radicals, alicyclic-alkyl radicals, and aralkyl radicals in which a carbon atom chain is interrupted at least once by an oxygen atom and at least one such carbon atom attached to an ethereal oxygen atom, is an acyclic carbon atom; $R_1$ is a member of the class of radicals consisting of (a) the same radical as R, without the lower limitation of 8 carbon atoms; (b) non-aryl hydrocarbon radicals having 7 carbon atoms or less and in turn selected from the group of alkyl radicals, aralkyl radicals and alicyclic radicals; (c) hydroxyalkyl radicals and hydroxyalkoxy radicals, in which the alkylene radical contains less than 8 carbon atoms; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals, in which any alkylene radicals present are selected from the group consisting of ethylene, propylene, butylene and methylbutylene, and $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

Monobasic carboxy detergent-forming acids contain at least 8 and not more than 32 carbon atoms. They are exemplified by higher fatty acids, naphthenic acids, resinic acids, oxidized petroleum acids and the like. They combine with alkalies to form soap or soap-like materials. This expression "monobasic carboxy detergent-forming acids" is frequently used in the demulsification art in this sense.

The amino nitrogen atom must be free from directly linked acyl radicals or aryl radicals. Stated another way, the nitrogen atom must be a basic amino nitrogen atom. See "Textbook of Organic Chemistry," Richter, 2nd edition, page 253.

Compounds of the kind above described are obtained from hydroxylated etheramines by reaction with low molal monocarboxy acids having less than 8 carbon atoms. The hydroxylated derivatives are conveniently obtained in many instances from etheramines having either 1 or 2 residual amino hydrogen atoms; for instance, a compound such as $(C_8H_{17}OC_2H_4OC_2H_4OC_2H_4)_2NH$ may be reacted with an oxyalkylating agent having a reactive ethylene oxide ring. As typical examples of applicable compounds may be mentioned glycerine epichlorhydrin, glycide alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

As to a process for preparing amines of the kind herein contemplated as reactants for combination with low molal monocarboxy acids, reference is made to U. S. Patent No. 2,334,517, dated November 16, 1943, to Tucker; 2,325,514, dated July 24, 1943, to Hester; and French Patent No. 837,604, dated February 15, 1939, to I. G. Farbenindustrie, A.-G.

The aforementioned U. S. Patent No. 2,325,514 is concerned with compounds of the formula type:

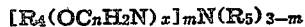

wherein $R_4$ is an aliphatic hydrocarbon group of less than 13 carbon atoms, $C_nH_{2n}$ represents an alkylene group in which $n$ is an integer having a value of 2 to 4, inclusive, $x$ is an integer of at least 1, $m$ is an integer having a value of 2 to 3, inclusive, and $R_5$ is a member of the class consisting of hydrogen, hydroxyalkyl, and hydrocarbon groups.

In the instant case the utility of the product is not limited to $R_4$ in the previous formula being necessarily aliphatic and the number of carbon atoms may be 13 or more. For instance, in a subsequent example where reference is made to octyl bromide, decyl bromide or octadecyl bromide, may be used, although the reaction takes place more slowly as one employs a bromide of higher molecular weight. One may use alkylated benzyl chlorides in which alkyl groups, for instance, ethyl, propyl, amyl, or octyl groups are introduced into the aromatic nucleus. Similar products may be obtained from substituted naphthalenes by reaction with formaldehyde, and hydrochloric acid so as to obtain the polycyclic analogs. Such procedure, involving chloromethylation is well known. The following will serve as an illustration of the reactant described immediately preceding:

*Etheramine, Example 1*

A mixture of 82 parts of triethanolamine, 66 parts of sodium hydroxide, and 318 parts of normal octyl bromide was heated at 130°-140° C. on an oil bath for four hours. The reaction mixture was then cooled, washed with water, dried over sodium sulfate, and distilled under reduced pressure. A fraction distilling between 165° C. and 185° C. at 3 mm. pressure was chiefly $$(C_8H_{17}OC_2H_4)_2NC_2H_4OH$$

with a small amount of the mono-octyloxyethyl ethanolamine. The fraction distilling between 185° C. and 205° C. was practically pure bisoctyloxyethyl ethanolamine.

*Etheramine, Example 2*

Decyl bromide is substituted for octyl bromide in the preceding example.

Other suitable reactants are described in U. S. Patent No. 2,334,517, dated November 16, 1943, to Tucker. Said Tucker patent is concerned with compounds of the formula

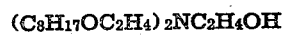

wherein $R_6$ is an alkyl radical having 8 to 22 carbon atoms, $R_7$ is a hydroxy alklyene radical having not more than 4 carbon atoms connected to $R_6$ through an ether linkage. A is selected from the group consisting of hydrogen, an alkyl radical and an alkylol radical, and $A_1$ is an alkylol radical, the radicals represented by A and $A_1$ each having not more than 4 carbon atoms.

Typical compounds described in the aforementioned Tucker patent and the method of making same, may be illustrated by the following brief description, which is substantially verbatim as it appears in the aforementioned Tucker patent.

*Etheramine, Example 3*

In a known manner lauryl alcohol is reacted with epichlorhydrin in the presence of a suitable catalyst such as stannic chloride, antimony pentachloride, boron trifluoride, or perchloric acid, to produce lauryl monochlorhydrin ether. Although good yields of lauryl monochlorhydrin ether are obtained under normal conditions of reaction, it may be desired to obtain a substantially pure product, in which case the products of the above reaction may be dissolved in ether and washed with water, and subsequently fractionally distilled.

56 parts of the lauryl monochlorhydrin ether thus formed are mixed with 23 parts of diethanolamine and the mixture is heated with stirring for about 2½ hours at 170° to 180° C. Residual hydrochloric acid may then be eliminated by boiling the reaction mix with caustic soda solution for a brief period. If desired, this product may be purified by washing an ether solution of same with water, following which the product may be recovered from the ether solution.

A product prepared in accordance with this example consisted predominantly of a compound having the formula

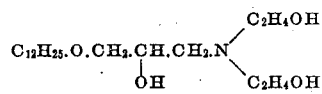

*Etheramine, Example 4*

The lauryl monochlorhydrin ether prepared in Example 3 is converted to lauryl glycidyl ether by refluxing at atmospheric pressure a mixture of 60 parts of the monochlorhydrin ether with 12 parts of sodium hydroxide in 20 parts of water. The ether is washed with water and subsequently recovered.

To 48 parts of the lauryl glycidyl ether are added 20 parts of morpholine and the mixture is heated to refluxing at 150 to 160° C. under a blanket of nitrogen. After the reaction has reached substantial completion, as is indicated when a sample of the reaction mix dissolves to clear solution in a normal hydrochloric acid solution, the excess or unreacted morpholine may be removed by continuing the heating under vacuum and passing a stream of nitrogen gas therethrough. A product prepared in accordance with the above procedure will closely correspond to one having the following formula:

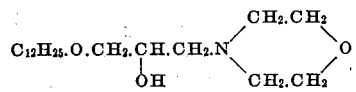

*Etheramine, Example 5*

Tetradecyl glycidyl ether is prepared in a manner similar to that employed in the preparation of lauryl glycidyl ether above described.

To 54 parts of the tetradecyl glycidyl ether are added 49 parts of trimethylolaminomethane corresponding to the ratio of 1 mole of ether to 2 moles of amine, and the mixture is stirred while slowly heating to 170° C. Reaction is allowed to proceed at 170° to 180° C. for about 1 hour, after which the product is freed from excess amine by washing an ether solution of the reaction product with brine. A product so prepared consisted predominantly of a compound having the formula:

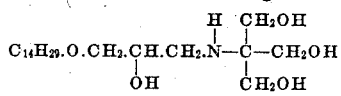

Additional reactants are described in the previously mentioned French Patent No. 837,604, dated February 15, 1939, to I. G. Farbenindustrie. Said French patent is concerned with the preparation of condensation products produced by reacting compounds containing at least one alcoholic group bound to a basic nitrogen atom in the presence of alkaline metallic compounds, with compounds of the formula X—R₈ in which R₈ equals an alkyl, cycloalkyl, aralkyl, aryl, or a heterocyclic radical, and X is a halogen atom or a group capable of being replaced. Particular reference is made to that part of the aforementioned French patent which is concerned with preparation of a product of the following formula:

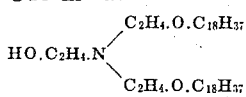

Similarly, other directions are concerned with the production of products of the formula

Particular attention is directed to the French patent for the reason that it illustrates compounds in which the high molal groups substituted for aminohydrogen atoms may contain as many as 32 carbon atoms, and may contain cyclic structures of various kinds, as enumerated in the first claim of said French patent.

The amino nitrogen atom must be free from directly linked acyl radicals or aryl radicals. Stated another way, the nitrogen atom must be a basic amino nitrogen atom. See "Textbook of Organic Chemistry," Richter, 2nd edition, page 253.

Previous reference to French Patent No. 837,604 is concerned with the manufacture of etheramines from high molal halides, such as chlorides or bromides. Although such high molal halides can be obtained in various ways, they are most conveniently obtained from alcohols, which, in turn, are obtained from high molal acids. Such alcohols may be produced from naphthenic acids, resin acids, fatty acids, oxidized petroleum acids, or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted as indicated in the aforementioned French Patent No. 837,604. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, such amines include a hydroxylated hydrocarbon radical.

In view of what has been said, it will be noted that the group introduced into the amine molecule in a manner so as to involve at least one ether linkage and derived at least hypothetically from an acid, is really the carbon atom chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom or a small number of hydrogen atoms have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not relied upon to supply points of chemical activity, as far as the herein contemplated compounds are concerned. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon," is intended to include the hydroxyhydrocarbon type of the kind in which the hydroxyl group does not materially reduce the hydrophobe character of the hydrocarbon group, as, for example, the group or radical which would be obtained from ricinoleic acid. The presence of such hydroxy radical would require an extra mole of carboxy acid, to insure an ester radical of the kind hereinafter described.

In addition to synthetic carboxy acids obtained by the oxidation of paraffins or the like, there is the somewhat analogous class obtained by treating carbon dioxide or carbon monoxide in the presence of hydrogen or an olefine, with steam, or by causing a metallic alkoxide or a halogenated hydrocarbon to react with chloracetic acid, or with potassium cyanide, and saponifying the product thus obtained. Such products or mixtures thereof, having at least 8 and not more than 32 carbon atoms, and having at least one carboxy group or the equivalent thereof, are as suitable for use as the conventional detergent-forming monocarboxy acids, and another analogous class equally suitable, is the mixture of carboxylic acids, obtained by the alkali treatment of alcohols of higher molecular weight formed in the catalytic hydrogenation of carbon monoxide. The synthetic carboxy acids so obtained can be converted into high molal etheramines by the same procedure as employed for the conversion of other carboxy acids.

Reference has previously been made to the fact that such amines may be treated with oxyalkylating agents and such agents are preferably selected from members having not over 5 carbon atoms, such as ethylene oxide, propylene oxide, butylene oxide, methylbutylene oxide, or glycide. Similarly, the amine which is converted into an alkoxide may be treated with an oxyalkylating agent and then converted into the alkoxide. For instance, triethanolamine might be treated with metallic sodium or sodium hydroxide, so as to convert it into the alkoxide, or triethanolamine might be treated with 1 to 15 moles of ethylene oxide, propylene oxide and the like and then converted into the alkoxide for further reaction. It is to be noted that the same oxyalkylating agent need not be employed throughout the entire process. This applies to an oxyalkylating step whenever used.

Having obtained suitable high molal hydroxylated etheramines of the kind previously described, such products are subjected to esterification with low molal monocarboxy acids having 7 carbon atoms or less. Some of such acids have been previously described in characterizing the acyl radical R₃CO. Additional examples of the hydroxylated type have been mentioned. Other suitable cyclic acids include furoic, unsaturated acids, acrylic, crotonic, tiglic, etc.

The esterification reactions are conducted in the usual manner. In such instances where there are two polyglycol radicals present, one may introduce a low molal acyl radical as a substituent for each terminal hydrogen atom. It is my preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent such as an anhydride or other suitable derivative.

In the instance of acids having boiling points in excess of 175° C., for instance, normal caproic acid, it is my preference to add a stoichiometric equivalent and conduct the reaction until the amount of water eliminated is equal to, or almost equal to, the theoretical yield. Hydroxyacetic acid may be employed in the same manner.

In the following examples, reference is made to the use of certain low molal acids. Actually, the esterification reaction can be accelerated by the use of the anhydride, i. e., using 1 mole of the anhydride to replace 2 moles of acid, except in such instance where there is no objection to excess acid, and where the excess acid or excess anhydride is subsequently removed, one may replace each mole of acid by 1 mole of anhydride. Particular reference is concerned with the use of acetic anhydride, propionic anhydride, n-butyric anhydride, isobutyric anhydride, n-valeric anhydride, n-caproic anhydride, and particularly the last five, where the boiling points of the anhydrides vary from 169° to 242°. When the corresponding acid is formed, such acid may serve as a reactant in the esterification reaction, or can be removed by vacuum distillation. Reference has been made to the acids, only because they are more generally available, but where the acyl chloride is available, the anhydride can be obtained from the acyl chlorides and the salt, or by other suitable means.

It has been pointed out that the herein contemplated hydroxylated etheramines used as reactants are basic in character. Thus, the initial reaction between the amine and the low molal carboxy acid results in salt formation. The esterification reaction involved the elimination of water from the salt. However, the esterified amine herein contemplated is still basic in character and combines with acids, particularly inorganic acids to form salts, and this has been pointed out previously in the hereto appended claims. Reference to amines includes the anhydro base, the hydrated base, i. e., the ammonium form, or any suitable salt, including salts of the various low molal carboxy acids herein contemplated as reactants. This means, among other things, where an excess of the low molal acid or anhydride is used for esterification, as much as a mole of such acid may be retained, insofar that the esterified high molal amino-polyglycol may be in essence a salt, and not the anhydride base. The salts of the low molal acids tend to revert to the free base and the acid itself under such conditions which tend to remove the acid, i. e., vacuum distillation. The salt form, particularly the salts of the low molal carboxy acids, are perfectly satisfactory for the purpose herein contemplated, and when dissolved in solutions of stronger acids such as sulfuric acid, hydrochloric acid, phosphoric acid, nitric acid, etc., an acid exchange reaction takes place and such solution may be particularly effective for those purposes wherein an acidic combination is indicated.

Previous reference was made to the fact that ether-amines containing either one or two amino hydrogen atoms can be treated with oxyalkylating agents having a reactive ethylene oxide ring. Such elimination of any amino hydrogen atom serves two purposes: in the first place, the formation of amides are eliminated, and in the second place, if a reactive hydroxyl radical were not previously present, it is so supplied for reaction with a low molal carboxy acid or the like.

It is to be noted that the same oxyethylating agent need not be employed throughout the entire oxyethylation process. For instance, the secondary amine dioctylamine might be reacted with one mole of ethylene oxide, and two moles of propylene oxide, or such compound might be treated with 1 mole of glycide and then with 2 or 4 moles of ethylene oxide. It would be equally feasible to use 2 moles of ethylene oxide and then 1 mole of glycide. This same procedure could be applied just as effectively to primary amines. Its special significance is as follows: If a secondary amine indicated by

is treated with 2 moles of ethylene oxide to give

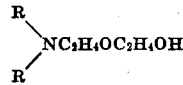

such product could then be treated with 1 mole of glycide to give a diol group, as follows:

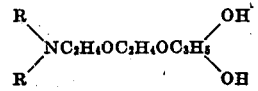

Such product has the advantage that, after being reacted with a low molal monocarboxy acid, there is present an available hydroxy radical for further reaction.

Previous reference has been made to the fact that many of the amines herein contemplated as reactants may be considered conveniently as derivatives of high molal monocarboxy acids, and particularly higher fatty acids. Some of these higher fatty acids, such as hydroxystearic acid, ricinoleic acid, dihydroxystearic acid, dichloro-ricinoleic acid, etc., may contain at least one hydroxyl radical. If such products are converted into amines, the radicals R in the formulas immediately preceding, also include an additional alcoholic hydroxyl radical.

As will be indicated hereafter, the low molal acid which reacts with an alcoholic hydroxyl group, may also, in turn, contain a reactive hydroxyl radical, as in the instance of lactic acid or hydroxyacetic acid, or the like.

In regard to the oxyalkylation of high molal amines without such amines being etheramines, attention is directed to the various patents. For instance, reference is made to U. S. Patent No. 2,174,762, dated October 3, 1939, to Schuette et al. Such patent is concerned with oxyethylation of amines sufficient to produce water solubility. In the present instance the number of recurring ether linkages in any single chain are preferably limited to 3 and water solubility may or may not occur. In other words, an oxyethylated high molalamine which is water-insoluble may serve as an intermediate reactant.

See also U. S. Patent No. 2,195,194, dated March 26, 1940, to Ulrich et al. As to methods which can be readily adapted for the oxyalkylation of high molalamines, as herein contemplated, see U. S. Patent No. 2,275,470, dated March 10, 1942, to Ruark, and U. S. Patent No. 2,337,004, dated December 14, 1943, to Schwoegler.

The following reactions are purely by way of illustration, and the description is substantially that appearing in the above mentioned patents. Etheramines have been substituted for the reactants therein noted, but other reacting conditions can be maintained without change, insofar that the presence of the ether linkage does not affect reactivity towards the reactants employed for oxyalkylating.

HIGH MOLAL ETHERAMINO-POLYGLYCOL

Example 1

1 pound mole of an amine of the following composition:

$$(C_8H_{17}OC_2H_4OC_2H_4OC_2H_4)_2NH$$

is caused to react with 1 molecular proportion of epichlorhydrin which is added to the reaction mixture in small proportions, after which 2 molecular proportions of ethylene oxide are then brought into reaction at 0° C. in the presence of 0.5% of sodium ethylate. The reaction can also be conducted conveniently, if suitable caution is employed and at the same temperature or slightly higher temperature, by using glycide instead of the epichlorhydrin. This has the advantage that no hydrochloric acid is liberated to form a salt.

HIGH MOLAL ETHERAMINO-POLYGLYCOL

Example 2

The secondary amine used in the prior example is replaced by 1 pound mole of:

$$(C_8H_{17}OC_2H_4)_2NC_2H_4OH$$

The above amine may be esterified without a prior oxyalkylation step, but preferably, is oxyalkylated in the same manner as the secondary amine in the prior example.

HIGH MOLAL ETHERAMINO-POLYGLYCOL

Example 3

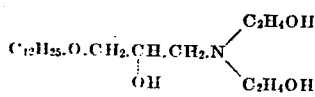

is prepared according to the directions previously noted, and used as such, or after reaction, with 3 to 9 moles of ethylene oxide in the manner previously described.

HIGH MOLAL ETHERAMINO-POLYGLYCOL

Example 4

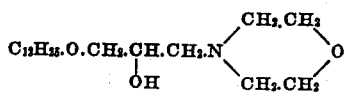

is used instead of the amine described in Example 1, preceding. 4 moles of ethylene oxide are used instead of 2 moles of ethylene oxide. Such an amine may be esterified without the prior oxyalkylation step.

HIGH MOLAL ETHERAMINO-POLYGLYCOL

Example 5

An amine of the following composition is prepared in accordance with previous directions:

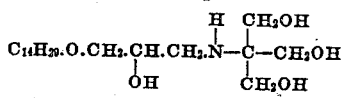

The above amine may be used as such, or after reaction with 4 to 12 moles of ethylene oxide in the previously described manner.

HIGH MOLAL ETHERAMINO-POLYGLYCOL

Example 6

An amine of the following composition:

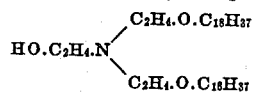

is reacted in the manner described under the heading "Example 5," immediately preceding, and may also be used directly for esterification without oxyalkylation.

HIGH MOLAL ETHERAMINO-POLYGLYCOL

Example 7

is obtained in accordance with previous directions, and used as such, or after being subjected to oxyethylation with 2 moles of ethylene oxide.

Having obtained suitable high molal hydroxylated etheramines of the kind previously described, such products are subjected to esterification with low molal monocarboxy acids having 7 carbon atoms or less. Some of such acids have been previously described in characterizing the acyl radical R₂CO. Additional examples of the hydroxylated type have been mentioned. Other suitable cyclic acids include furoic, unsaturated acids, include acrylic crotonic, tiglic, etc.

The esterification reactions are conducted in the usual manner. In such instances where there are two polyglycol radicals present, one may introduce a low molal acyl radical as a substituent for each terminal hydrogen atom. It is my preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent, such as an anhydride or other suitable derivative.

In the instance of acids having boiling points in excess of 175° C., for instance, normal caproic acid, it is my preference to add a stoichiometric equivalent and conduct the reaction until the amount of water eliminated is equal to, or almost equal to, the theoretical yield. Hydroxyacetic acid may be employed in the same manner.

MONOCARBOXY ESTER OF HIGH MOLAL ETHERAMINO-POLYGLYCOL

Example 1

1 pound mole of the product described under the heading "High molal etheramino-polyglycol, Example 3" is heated with 2 pound moles of isobutyric acid for approximately 8 to 18 hours at 150°–155° C. The esterification is conducted by means of a hot condenser, that is, a condenser with the temperature regulated so as to be maintained at approximately 105° C. to 112.5° C. Such arrangement permits the elimination of much, if not all, of the water of esterification, but condenses and returns substantially all of the butyric acid for further reaction. The progress of the esterification reaction can be followed by the use of a second trap condenser to return and measure the water of reaction. Such water should be titrated for determination of any acid which may have distilled over. At the end of such esterification period the excess butyric acid is eliminated by distillation, and if preferred, vacuum distillation may be employed. The final product is substantially free from uncombined butyric acid. The amount of base required for saponification of the ester, is, of course, a means of measuring the degree of esterification. Saponification re-liberates the butyric acid. The product shows excellent solubility in dilute acetic acid or dilute mineral acid. The product derived from commercial raw materials is an amber-colored, viscous or paste-like compound at ordinary room temperature, and if contaminated by the presence of metallic iron or the like, may show even a darker appearance. The salt forms are more solid in nature than the anhydro base. Such appearance is typical of the entire class of materials herein described.

MONOCARBOXY ESTER OF HIGH MOLAL ETHERAMINO-POLYGLYCOL

Example 2

The high molal etheramino-polyglycol described under the heading of Example 1, is substituted for the high molal etheramino-polyglycol used in the preceding example.

MONOCARBOXY ESTER OF HIGH MOLAL ETHERAMINO-POLYGLYCOL

Example 3

The same procedure is followed as in the preceding two examples, except that high molal etheramino-polyglycols having at least 1 ether linkage, and preferably, two ether linkages, and obtained by the use of glycide alone, or glycide, in combination with ethylene oxide, in the manner described in high molal etheramino-polyglycols, Examples 3 to 7, inclusive, are substituted for Examples 1 and 2 in the preceding example.

MONOCARBOXY ESTER OF HIGH MOLAL ETHERAMINO-POLYGLYCOL

Example 4

The same procedure is followed as in the two preceding examples, with the exception that instead of using 8 moles of the low molal acid per mole of etheramino-polyglycol, one introduces only one hydroxyl radical into an ester radical. Under such circumstances, the yield may not be as large as in preceding examples, and there may be some minor portions of uncombined reactants remaining in the final product. This does not interfere with the use of the compounds for various purposes, as hereinafter described. One mole of anhydride may be used for 2 moles of etheramino-polyglycol.

MONOCARBOXY ESTER OF HIGH MOLAL ETHERAMINO-POLYGLYCOL

Example 5

Esterification is conducted by means of an acid having a substantially higher boiling point such as normal caproic acid. Under such instances, no excess of acid is necessarily added, and one may use either 1 mole of acid, or 2 moles of acid, depending upon whether there are as many as 2 hydroxyl radicals present per mole of etheramino-polyglycol, and also depending upon whether or not one desires to convert both hydroxyl radicals, if present, into ester radicals. The temperature of esterification is approximately 175°–195° C., and the condenser employed is a cold condenser with suitable arrangement to trap the water of esterification as formed, and also return any unreacted acid for further reaction. (Such arrangement is suitable where the acid is volatile and water-insoluble.) There is no difficulty in regard to the loss of the low molal acid, because, although it is volatile at the indicated temperature, yet it is readily condensable. Thus, as specific procedure illustrating the present example, one may use 1 mole of etheramino-polyglycol, Example 3, preceding, and 1 mole of caproic acid, or else one mole of the other previously employed etheramino-polyglycol; one may employ 2 moles of caproic acid in such instances where it is desired to convert both hydroxyl radicals into ester radicals.

MONOCARBOXY ESTER OF HIGH MOLAL ETHERAMINO-POLYGLYCOL

Example 6

The same procedure is employed as in the previous example, except that anhydrous hydroxyacetic acid is employed instead of capric acid. One obtains the monohydroxyacetate of the high molal etheramino-polyglycol, if Example 1, is employed, and one may obtain either the monohydroxyacetate or the di-hydroxyacetate, as previously explained, in the event that other polyhydric amino-polyglycols are employed.

Previous reference has been made to high molal etheramino-polyglycols as reactants, for the reason that it is my preference to employ products in which there is at least one ether linkage obtained by the use of 2 or more moles of ethylene oxide per aminohydrogen atom. If desired, however, one may employ a single mole of the oxyalkylating agent, such as ethylene oxide, for each available aminohydrogen atom. In such event, the product obtained is not a polyglycol, but an aminoalcohol, insofar that there is a single alkylene radical present and no ether linkage. Such type of reactant may be employed in the present instance, if desired. Regardless of what type of reactant is employed, the final product is invariably soluble in or produces a colloidal salt in dilute acetic acid or dilute mineral acid. Completeness of reaction can be checked in each instance in the manner previously indicated.

In the case of hydroxyacetic acid, one may use a distinctly higher temperature without volatilization of the acid than in the instances where caproic acid is employed. For instance, the esterification involving hydroxyacetic acid may employ a temperature as high as 215° C.

Many of the preceding examples will be found to be soluble in water, even in the absence of acid. Some of the products are soluble in or produce a turbid sol or suspension in gasoline, kerosene, benzene, or cresol.

Previous reference has been made to the use of the anhydride as an acylating agent instead of the free acid. Probably, salt formation is eliminated until esterification begins with liberation of a molecule of acid for each molecule of anhydride added. The liberated acid acts, of course, as if it had been added at the beginning of the reaction, and additionally, presents a modification, in that water is not eliminated, unless esterification takes place by virtue of the free acid. If, however, the entire esterification reaction involves only the anhydride and no acid, water would not be liberated. Thus, the measurement of the condensed water, if any, under such circumstances, is not necessarily an index of esterification. Other procedure must be used, although unfortunately, no method of measurement is available which is relatively quick and absolutely satisfactory to a precise and quantitative degree. If a salt is formed, titration with caustic soda or potash converts the salt into the free base. The particular end point, using the usual indicators, is rather indefinite, and thus, the use of additional alkali to determine the saponification value, results in a determination of somewhat approximate value, due to such difficulties of analytical manipulation. The values obtained, however, even though only approximate, are perfectly satisfactory for the present purpose. Other suitable procedure, but more laborious, involves the saponification of the product, followed by acidification with a non-volatile mineral acid, e. g., sulfuric acid, and distillation of the low molal carboxy acids which were originally combined in ester or salt form, followed by the usual volumetric procedure in correlation to the original sample.

The following reactions illustrate the formula of the high molal etheraminoalcohols and etheraminopolyglycols and also their esterification products, without reference to the formation of the hydrated base, or of a salt form of the anhydro base. In the subsequent structural illustrations where $R_1$ appears, it is assumed, for convenience, that $R_1$ in such instance as illustrated, does not include a hydroxyl radical. Oxyalkylation under such circumstances, must, of necessity, involve the aminohydrogen atom. Actually, it would not matter if the radical indicated by $R_1$ does contain a hydroxyl radical, for the reason that the linkage involving a hydrogen atom and an amino nitrogen atom, as contemplated in the herein described reactants, appears to be more susceptible to oxyalkylation than the hydrogen oxygen linkage of the hydroxyl group. After the first mole of oxyalkylating agent is introduced into the amino hydrogen position, whether it be ethylene oxide or glycide, the resulting radical is the equivalent of $R_1$ in such instances where $R_1$ does contain an alcoholic hydroxyl group. It would not matter if the next mole of oxyalkylating agent attacked the hydroxyl of $R_1$, or the hydroxyl of the alcoholic group which replaced the aminohydrogen atom. Stated in another way, if $R_1$ is a hydroxylated radical, then $R_2OH$ and $R_1$ would be the equivalent of each other, and $R_3COOH$ in the resulting esterification reaction would combine as readily in most instances with the $R_1$ radical as with the $R_2OH$ radical. One must not lose sight of the fact that esterification must involve a tertiary amine, and thus, eliminate amidification as a possible reaction. If $R_1$ does contain an alcoholic hydroxyl and is reactive, and if the amine is the secondary amine, then in each instance the reaction must be conducted by the use of suitable quantities of an alkylating agent so as to eliminate the aminohydrogen atom.

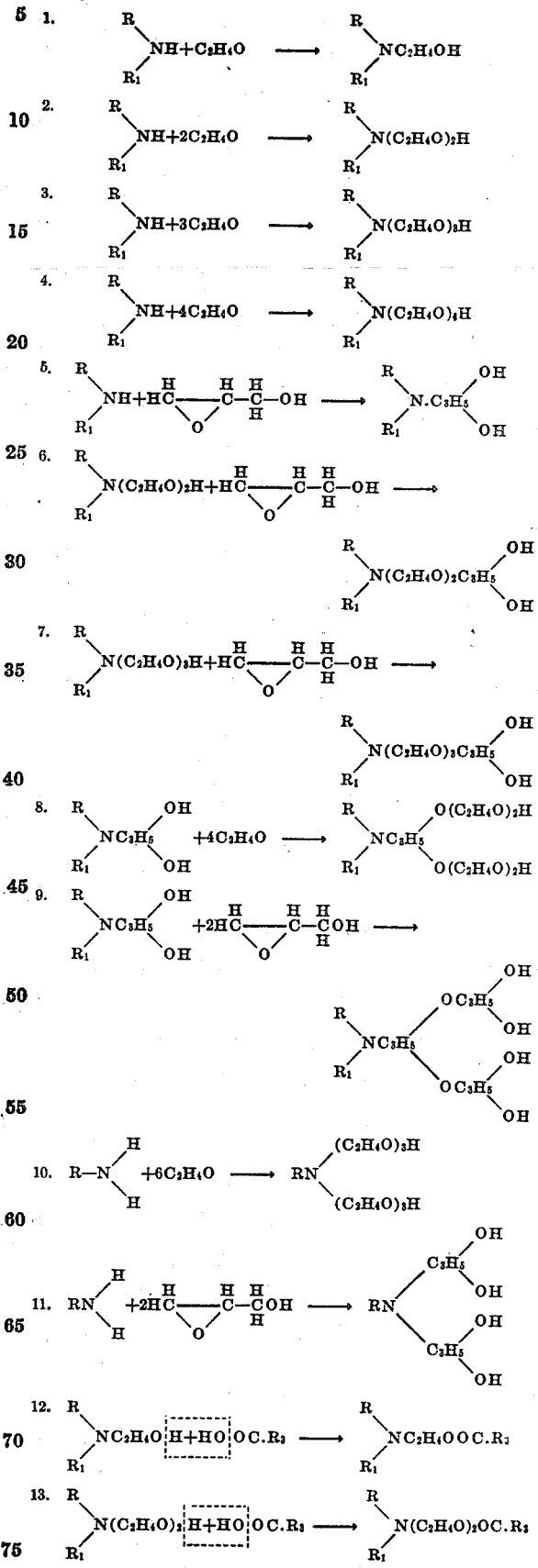

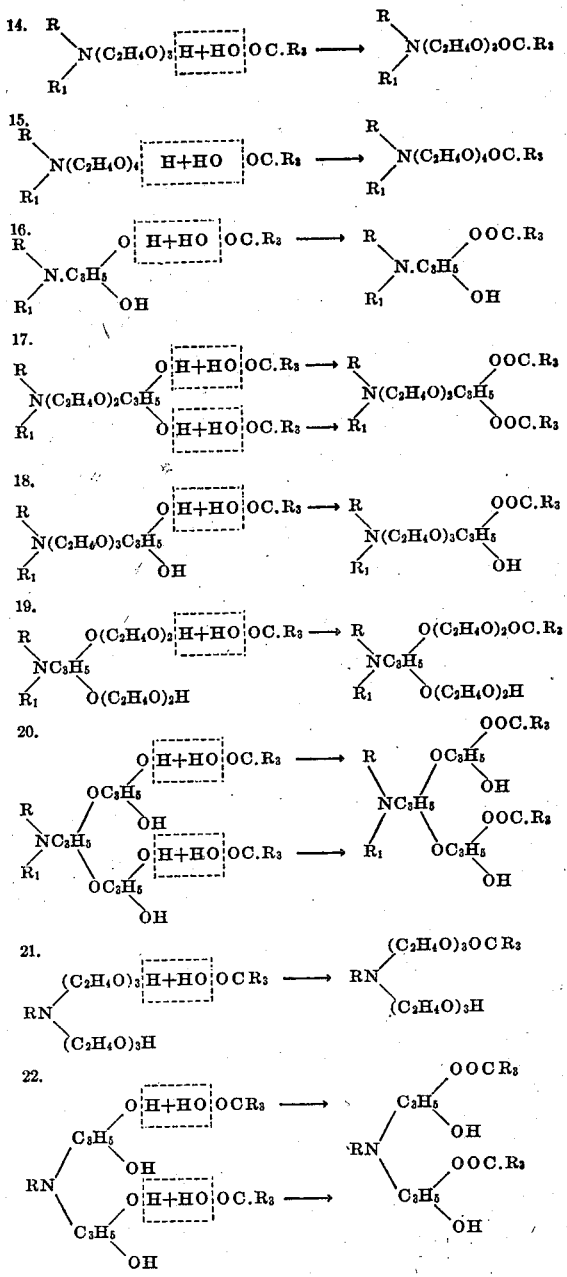

As will be noted, in such instances where butylene oxide replaces ethylene oxide, the number of carbon atoms in the polyglycol attached to the aminonitrogen N may be as high as 15.

In light of the previous description and formulae the structure of the compounds originally presented may be advantageously summarized as follows:

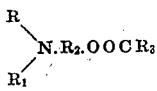

in which R is an ether radical having as an integral part thereof an hydrocarbon radical containing 8 carbon atoms and not more than 32 carbon atoms or more, and more particularly an alkyl radical, an alicyclic-alkyl radical, or an aralkyl radical in which a carbon atom chain is interrupted at least once by an oxygen atom and at least one such carbon atom attached to an ethereal oxygen atom, is an acyclic carbon atom; $R_1$ is the same as R without the lower limitation of 8 carbon atoms, or $R_1$ may be any non-aryl hydrocarbon atom radical having 7 carbon atoms or less, and especially, alkyl, aralkyl and alicyclic in character, and additionally, $R_1$ may be hydroxyalkyl including hydroxyalkyl radicals, where the carbon atom chain is interrupted at least once by an oxygen atom, provided the alkylene radical of said immediately aforementioned alkyl and hydroxyalkyl radicals contain less than 8 carbon atoms; $R_2$ is a divalent radical having less than 16 carbon atoms and not more than 3 ether linkages, and a member of the class consisting of alkylene radicals, hydroxyalkylene radicals, alkyleneoxy radicals, hydroxyalkyleneoxy radicals, polyglycol and hydroxypolyglycol radicals, in which any alkylene radicals present are selected from the group consisting of ethylene, propylene, butylene, and methylbutylene, and $R_3CO$ is an acyl radical of a low molal monocarboxy acid having less than 8 carbon atoms; with the added proviso that at least 1 of the three radicals $R_1$, $R_2$ and $R_3$ shall have present an alcoholic hydroxyl radical.

In view of the lower cost of primary amines in comparison with secondary amines, it is my preference to employ hydroxylated etheramines obtained by the oxyalkylation of primary amines, and particularly, those in which the amine radical R is derived from higher fatty acids, and especially those having 18 carbon atoms.

Previous reference has been made to the use of a polycarboxy reactant. Thus, combination can readily take place with typical polybasic carboxy acids, such as phthalic acid, succinic acid, malic acid, fumaric acid, citric acid, maleic acid, adipic acid, tartaric acid, glutaric acid, diphenic acid, naphthalic acid, tricarballylic acid, etc. Instead of acids one may, of course, use any functional equivalent, particularly the anhydride. The anhydride, when available, is a particularly suitable reactant when two carboxyl reactants are attached to adjacent carbon atoms. The most suitable acids are maleic, citraconic and phthalic. They are conveniently used in the form of the anhydride. Acids having 3 or more carboxyl radicals may be used, but I prefer to use the dibasic carboxy acids. Hydroxylated polycarboxy acids may be employed, but I prefer to use the non-hydroxylated type, insofar that they are, generally speaking, more resistant to pyrolysis.

Another type of polybasic carboxy acid which may be employed is the so-called adduct type. For instance, maleic anhydride or its equivalent is reacted with a number of well known types of reactants which contain conjugated double bonds and enter into the diene synthesis. The Diels-Alder adducts thus obtained represent mutable polybasic carboxy acids.

The somewhat similar adduct, in the sense that it involves the use of maleic anhydride or its equivalent, is the Clocker adduct. This is obtained from unsaturated acids, alcohols, or the like, which may have only one ethylene linkage, or is not conjugated in the event more than one ethylene linkage is present. The adduct is obtained at a distinctly higher temperature than the Diels-Alder adduct and appears to be acyclic. Cyclobutane structures may also be involved. In the event that either type of adduct is obtained from a detergent-forming monocarboxy acid, particularly a higher fatty acid such as the fatty acids derived from China-wood oil or linseed oil, the product so obtained is not considered as a detergent-forming acid derivative or a higher fatty acid derivative in the present instance.

It has been previously pointed out that the acylated amino-alcohols employed as reactants must have present a reactive alcoholic hydroxyl radical and may have present more than one such hydroxyl radical, and two, three, or even more. In the light of this fact, it is obvious that one may produce monomeric compounds comparable to dibutyl phthalate or linear polymers free from cross-linking as obtainable from ethylene glycol and phthalic anhydride, or else compounds in which cross-linking can take place to a greater or lesser degree, comparable to those obtainable from glycerol and phthalic anhydride. In any event, the final products obtained by esterification, must represent monomeric compounds, or else polymeric compounds comparable to an A stage, or a B stage resin, i. e., either they must still be fusible or soluble in selected solvents, or both. They must not represent the insoluble, infusible C stage resins.

Esterifications of this type are used so generally that further description appears unnecessary. The alcoholic reactant, i. e., the aminoglycol, is usually a fairly viscous or semi-solid material per se. Reaction with polybasic carboxy acids produces substances which may be viscous liquids, balsams, or hard solids, but in any event, they are sub-resinous in the sense that they have not reached what is commonly termed the C stage.

Esterification reactions, of course, are conducted in such a manner that an active carboxyl group or its equivalent is present along with another compound having an available active hydroxyl group. The reactions may be, and frequently are, catalyzed by the addition of a small amount of free acid, such as dry hydrochloric acid, a few per cent or less of an aromatic sulfonic acid such as paratoluene sulfonic acid. The temperature employed is above the boiling point of water, for instance, 160° to 180° C., or even higher, provided there is no pyrolysis. The reaction goes to completion by virtue of the fact that water of esterification, or its equivalent, is removed. Such water may be removed in any suitable manner, such as the passage of dry nitrogen gas, or by the use of an inert solvent, such as xylene or decalin. The progress of the reaction can be checked by determination of the amount of free acid present. Such esterification procedure or other esterification procedure which is readily available for use in the instant case, is described in numerous patents, including the following:

U. S. Patents Nos. 1,618,209, 1,663,183, 1,678,105, 1,813,838, 1,815,886, 1,848,155, 1,886,242, 1,890,668, 1,900,693, 1,902,477, 1,904,595, 1,909,196, 1,909,197, 1,921,756, 1,933,697, 1,938,791, 1,993,026, 2,006,555, 2,027,351, 2,027,467, 2,028,914, 2,033,280, 2,035,314, 2,035,346, 2,118,926, 2,166,934, 2,195,362, 2,170,889, 2,284,127, 2,305,083, 2,306,095, 2,323,706.

COMPOSITION OF MATTER

*Example 1*

A high molal etheramino-polyglycol is prepared in the manner previously described, by reacting 1 mole of a monohydroxylated amine of the formula:

with 1 mole of glycide and 2 moles of ethylene oxide. The dihydroxylated compound thus obtained is esterified with 1 mole of normal caproic acid in the manner previously described. The ester so obtained is reacted with 1 additional mole of glycide by the same procedure as has been described in detail for the unesterified aminoalcohols. The resultant contains 1 ester group and 2 unreacted hydroxyl radicals.

Such intermediate product is esterified with 1 pound mole of phthalic anhydride. The reaction is conducted approximately 165–195° C. until analysis shows that 1 carboxyl has been eliminated by esterification. A thick amber colored mass, substantially viscous or somewhat solid in nature, is obtained. In any event, esterification may be carried a little further, or perhaps not quite so far, but in any event, the final subresinous mass must represent an A or B stage resin, as differentiated from the insoluble and infusible C stage resin.

COMPOSITION OF MATTER

*Example 2*

1 pound mole of an amine of the following structure:

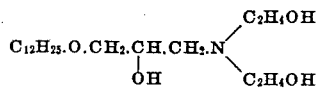

is reacted with 1 pound mole of normal caproic acid in the manner previously described and then with 1 pound mole of phthalic anhydride in the same manner as in Example 1, immediately preceding.

COMPOSITION OF MATTER

*Example 3*

An amine of the following composition

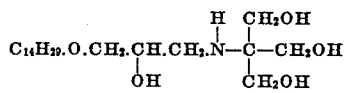

is substituted for the amine employed in Example 2, preceding.

COMPOSITION OF MATTER

*Example 4*

An amine of the following composition:

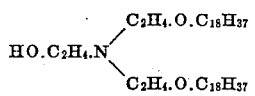

is substituted for the amine employed in Example 1, preceding.

COMPOSITION OF MATTER

*Example 5*

An amine of the following composition:

is reacted with 2 moles of ethylene oxide in the manner previously described, and then with 1 mole of normal caproic acid by the same procedure as employed previously. The ester so obtained is then treated with 1 pound mole of glycide, so as to form a dihydroxylated resultant. Thereafter, the same procedure is employed as previously described in Example 1, to wit, reaction in equimolar proportion until 1 carboxyl has been eliminated by esterification.

COMPOSITION OF MATTER

*Example 6*

The same procedure is followed as in Examples 1 to 5, preceding, except that anhydrous hydroxyacetic acid or isobutyric acid is substituted for normal caproic acid.

COMPOSITION OF MATTER
Example 7

The same procedure is followed as in Examples 1 to 6, immediately preceding, except that maleic anhydride, adipic acid, citraconic anhydride, succinic acid, or some other polybasic acid, particularly a dibasic acid, is substituted in the preceding examples. If the reaction involves the use of an acid instead of an anhydride, then such reaction can be conducted in the presence of an inert solvent such as xylene, decalin, etc., which removes the water in a slow but continuous manner.

COMPOSITION OF MATTER
Example 8

Preceding examples are repeated, except that polyhydroxylated reactants are used exclusively, and in each instance the polybasic acids are employed in such molar proportion, that there is one mole of polybasic anhydride (or 2 moles of the acid) employed for each available hydroxyl radical present in the hydroxylated etheramino-polyglycol. 1 mole of the etheramino-polyglycol is used. Complete reaction produces a compound with a plurality of unreacted carboxylic radicals.

COMPOSITION OF MATTER
Example 9

The same reactants are employed as in Composition of matter, Examples 1 to 8, preceding, except that the molal ratio is so changed that the available carboxylic radicals are just sufficient to combine with the available hydroxyl radicals. For instance, if the hydroxylated etheramino-polyglycol contains 1 hydroxyl radical, then 2 moles of such product are reacted with 1 mole of such dibasic acid or anhydride. Reaction is continued until both carboxyl radicals of the dibasic acid are eliminated.

COMPOSITION OF MATTER
Example 10

Compositions of matter exemplified by Examples 1 to 8, preceding, are reacted with glycerol under substantially the same esterification conditions as previously described. The amount of glycerol added may vary from an equimolar ratio to a ratio where there is 1 mole of glycerol added for each residual carboxyl radical present. Such products are particularly apt to give highly viscous or amorphous materials. When prepared in iron apparatus, the products are invariably of a deep red or amber color.

In order to illustrate derivatives obtained by reaction between a polybasic carboxy acid, and more especially, a dibasic carboxy acid and an esterified aminoalcohol of the kind described, the following formulae, along with indicated reactions, are included. Previous reference has been made to $R_3.COOH$ being a low molal monocarboxy acid. In some instances, such acid might contain an alcoholic hydroxyl group, as in the case of lactic acid, hydroxyacetic acid, etc. For convenience in the formulas appearing immediately hereafter, $OHR'_3.COOH$ is intended to refer specifically to the low molal monocarboxy acid having an alcoholic hydroxyl radical. $R_4(COOH)_n$ represents the polybasic acid in which $n$ represents a small whole number such as 2 or 3. For convenience, the formulae are limited to the dicarboxy type, $HOOC.R_4.COOH$. The formulae are based on reactions involving equimolar quantities, except in the last two instances, where two moles of the dicarboxy acid are used for each mole of dihydric ether aminoalcohol.

In examining the structural formulae immediately following, attention is directed as to what has been said previously in regard to the esterification of the aminoalcoholic body with a monocarboxy acid when $R_1$ did contain a hydroxyl radical. An analogous situation applies in the instant case, where the hydroxylated monocarboxy acid ester is subjected to reaction of a polycarboxy acid or derivative. It appears unnecessary to repeat what has been said, except to point out that isomers or more complex structures may be involved when $R_1$ contains 1 or more alcoholic hydroxyl radicals.

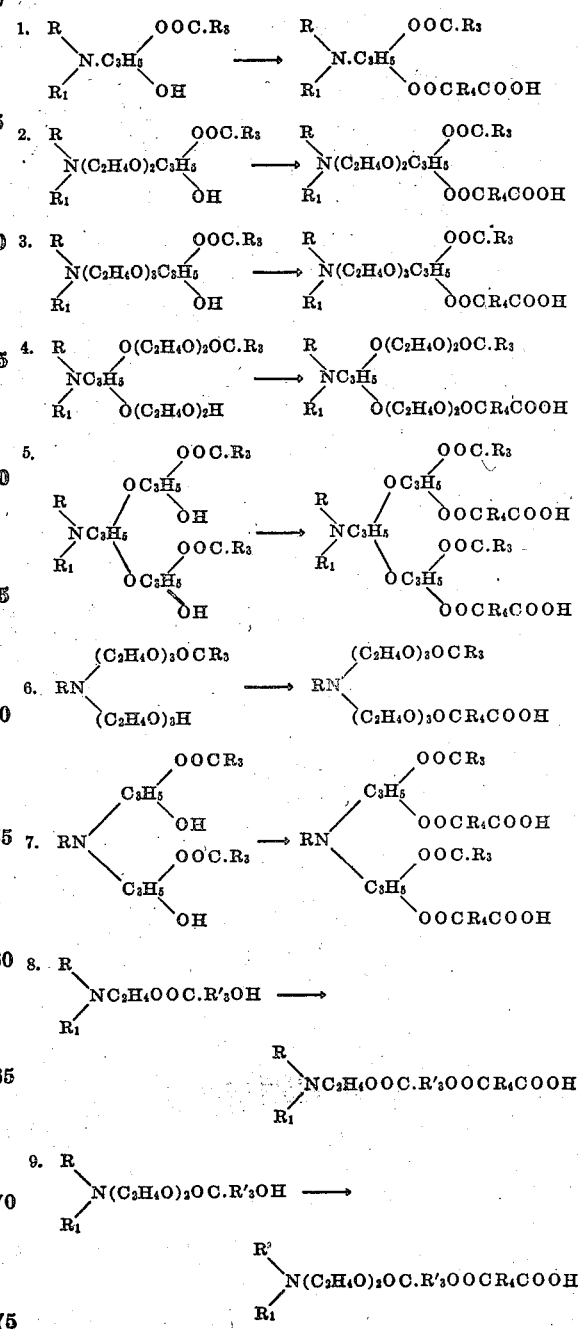

10. 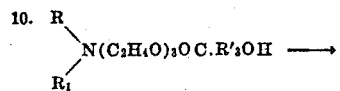
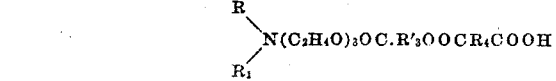

11. 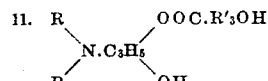
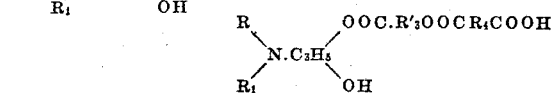

12. 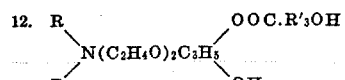
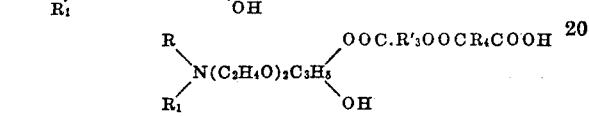

13. 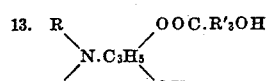
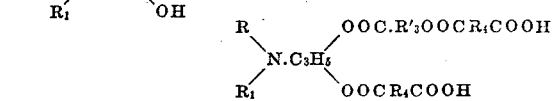

14. 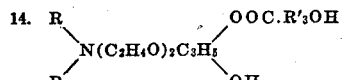
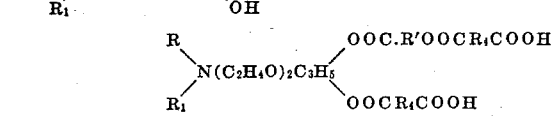

Previous reference has been made to the formula

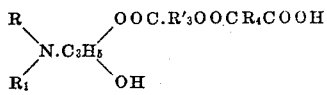

Examination reveals that reaction may have involved the other available hydroxyl radical, thus resulting in a compound of the following formula:

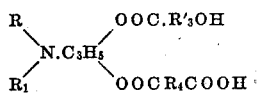

This also is true in regard to the following compound previously depicted and its isomer.

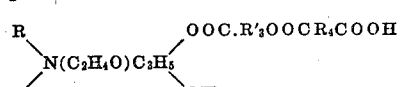

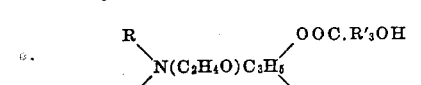

Any of the previous compounds illustrate hydroxy acids which may undergo condensation polymerization, and thus, form compounds of increased molecular weight. Compare with the formation of linear polymers, for example, from ethyleneglycol monoacid phthalate. Trihydric alcoholic structure, or the use of a tribasic acid would lead to cross-linking.

In any event, the formation of the polymers may be indicated as a derivative of the prior compound of the formula:

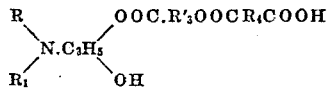

in the following manner:

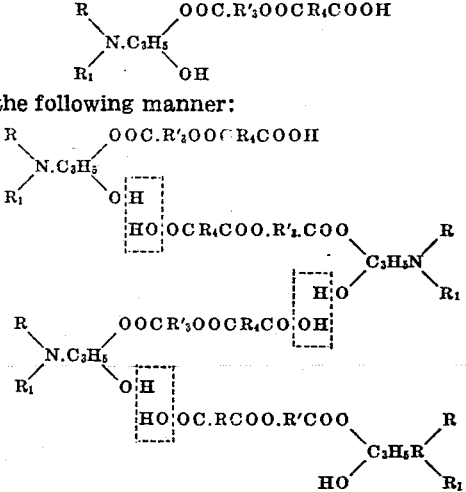

In the above presentation re-esterification has been ignored.

The hydroxylated amino-glycol of the kind previously described must contain at least one, and preferably more than one, alcoholic hydroxyl radical. Such reactant may be considered for the sake of simplicity, as being in the class of an alcohol, i. e., a monohydric or polyhydric alcohol. If an alcohol is indicated by the formula $Y'(OH)_n$, where $n$ indicates the number one or more, and if a polybasic acid body be indicated by the formula $X'(COOH)_n$, where $n$ indicates the number two or more, then the reaction between a monohydric alcohol and a polybasic acid will result in a compound which may be indicated by the following formula: $YX(COOH)_{n'}$, where $n'$ indicates the number one or more and which is in reality a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed phthalic anhydride, then examination reveals that the formulas might result in a combination in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals, or there might be both. This is indicated by the following:

$$(YX)_q(OH)_{n'}$$
$$(YX)_q(COOH)_{m'}$$
$$(OH)_{n''}(YX)_q(COOH)_{m''}$$

in which $q$ indicates a small whole number (one in the case of a monomer, and probably not over 20, and usually less than 10), and $m'$ and $n'$ indicate the number 1 or more, and $m''$ and $n''$ indicate zero or a small or moderately-sized whole number, such as zero, one or more, but in any event, probably a number not in excess of 40. Naturally, each residual hydroxyl could combine with phthalic acid or its equivalent, or with a tribasic acid, such as citric acid; and in such event, there would be a large number of free or uncombined carboxyl radicals present, possibly 1 to 20, or more. Actually, the preferable type of reagent would be more apt to include less than 10, and, in fact, less than 5, free hydroxyl radicals.

It is not necessary to remark that the residual carboxyl radicals can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexylamine, benzylamine, aniline, toluidine, etc. Conversion into the ester would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like. One could employ an amino alcohol so as to produce an ester.

If a tricarboxy acid, such as citric acid, is employed, then at least theoretically two moles of the hydroxylated esterified amino-glycol derivative might react with one mole of the citric acid compound. Similarly, as has already been pointed out, a large number of molecules of a polybasic acid compound might combine with a single molecule of a highly hydroxylated esterified aminoglycol. For practical purposes, however, we have found that the most desirable products are obtained by combinations, in which the ratio of aminoalcohol derivative to the polybasic acid is within the ratio of 3 to 1 and 1 to 5, and in which the molecular weight of the resultant product does not exceed 10,000, and is usually less than 5,000, or preferably, less than 3,000. This is particularly true, if the resultant product is soluble to a fairly definite extent, for instance, at least 5%, in some solvent, such as water, alcohol, benzene, dichlorethyl ether, acetone, cresylic acid, or the like. This is simply another way of stating that it is preferable, if the product be one of the sub-resins, which are commonly referred to as an A resin, or a B resin, as distinguished from a C resin, which is a highly infusible, insoluble resin. (See Ellis, Chemistry of Synthetic Resins, 1935, page 862, et seq.)

In recapitulating what has been said previously, the resinous, semi-resinous, or resinous product herein contemplated may be indicated by the following formula:

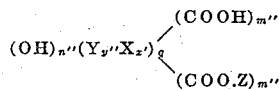

in which the characters have their previous significance, and $y'$ represents a small whole number not greater than 3, and $x'$ represents a small whole number not greater than 5; Z represents a hydrogen ion equivalent, such as a metallic atom, organic radical, etc.

Reference to the polycarboxy acid derivatives of esterified etheraminoalcohols and the other ethereal amino-glycol or amino-polyglycol compounds herein contemplated, is intended to include the salts and the anhydro base, as well as the hydrate base, since both obviously are present when an emulsion is treated with an amine or amino compound. ("In an aqueous solution of the amine, the anhydro base, R—NH₂, the hydrated base, R—NH₃—OH, and the 2 ions are all present." Richter, s. v., page 252.)

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my herein described process for resolving petroleum emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ration of 1 to 10,000 or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent employed in my process, is based upon its ability to treat certain emulsions more advantageously and at a somewhat lower cost than is possible with other available demulsifiers or convention mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process for resolving petroleum emulsions of the water-in-oil type, a treating agent or demulsifying agent of the kind above described is brought into contact with or caused to act upon the emulsion to be treated in any of the various apparatus now generally used to resolve or break petroleum emulsions with a chemical reagent. The above procedure being used either alone or in combination with other demulsifying procedure, such as the electrical dehydration process.

The demulsifier herein contemplated may be employed in connection with what is commonly known as down-the-hole procedure, i. e., bringing the demulsifier into contact with the fluids of the well at the bottom of the well, or at some point prior to the emergency of said fluids. This particular type of application is decidedly feasible when the demulsifier is used in connection with acidification of calcareous oil-bearing strata, especially if suspended in or dissolved in the acid employed for acidification.

Reference is made to co-pending applications, Serial Nos. 542,233, 542,234, 542,235, 542,336, and 542,338, filed June 26, 1944.

In the hereto appended claims reference to radicals derived from olefins oxides is intended to include glycid. In other words, in the case of propylene oxide, it is intended that hydroxypropylene oxide be included.

Since the herein described products are esters, it is hardly necessary to point out that saponification decomposes the product into its original components, to wit, an amine and an acid or acids. Actually, the acids are obtained in the form of salts, usually the sodium or potassium salts. Such conversion into the original components or simple modifications thereof results in products which can be examined in the customary manner, and thus serve to identify the esterified amine alcohol.

Having thus described my invention, what I claim as new and desire to secure by Letters Patent is:

1. A process for resolving petroleum emulsions of the water-in-oil type, characterized by subjecting the emulsion to the action of a demulsifier, comprising a sub-resinous esterification product of the formula:

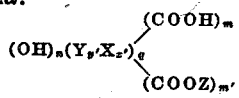

in which X is a polycarboxy acid radical selected from the class consisting of polycarboxy acids, anhydrides, monohydric alcohol esters and polyhydric alcohol esters, with the proviso that the alcohol radical of said esters be free from detergent-forming monocarboxy acid radicals, and $y'$ represents a whole number not greater than 3, and $x'$ represents a whole number not greater than 5, and $n$, $m$ and $m'$ indicate whole numbers from 0 to 40; q indicates a whole number from 1 to 20; Z is a hydrogen ion equivalent; Y is the radical of a basic esterified ether aminoalcohol of the formula:

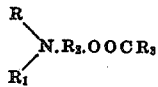

in which R is an ether radical having as an integral part thereof a hydrocarbon radical containing 8 carbon atoms and not more than 32 carbon atoms, and selected from the class consisting of alkyl radicals, alicyclic-alkyl radicals, and aralkyl radicals, in which a carbon atom chain is interrupted at least once by an oxygen atom and at least one such carbon atom attached to an ethereal oxygen atom is an acyclic carbon atom; $R_1$ is a member of the class of radicals consisting of (a) the same radical as R without the lower limitation of 8 carbon atoms; (b) non-aryl hydrocarbon radicals having 7 carbon atoms or less, and in turn, selected from the group of alkyl radicals, aralkyl radicals and alicyclic radicals; (c) hydroxyalkyl radicals and hydroxy-alkoxy radicals, in which the alkylene radical contains less than 8 carbon atoms; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals, in which any alkylene radicals present are selected from the group consisting of ethylene, propylene, butylene and methylbutylene, and $R_3CO$ is an acyl radical of a low molal monocarboxy acid having less than 8 carbon atoms; with the added proviso that at least 1 of the 3 radicals, $R_1$, $R_2$ and $R_3$ shall have present an alcoholic hydroxyl radical.

2. The process of claim 1, wherein the polybasic acid radicals are limited to the dicarboxy species.

3. The process of claim 1, wherein the polybasic acid radicals are limited to the dicarboxy species, and in which there is at least one alcoholic hydroxyl radical present as part of the radical $R_1$.

4. The process of claim 1, wherein the polybasic carboxy acid is phthalic acid and in which there is at least one alcoholic hydroxyl radical present as part of the radical $R_1$.

5. The process of claim 1, wherein the polybasic carboxy acid is maleic acid and in which there is at least one alcoholic hydroxyl radical present as part of the radical $R_1$.

6. The process of claim 1, wherein the polybasic carboxy acid is citraconic acid and in which there is at least one alcoholic hydroxyl radical present as part of the radical $R_1$.

MELVIN DE GROOTE.